Dec. 19, 1939.  H. ZIZELSBERGER  2,183,802
PHOTOGRAPHIC SHUTTER
Filed Aug. 11, 1938
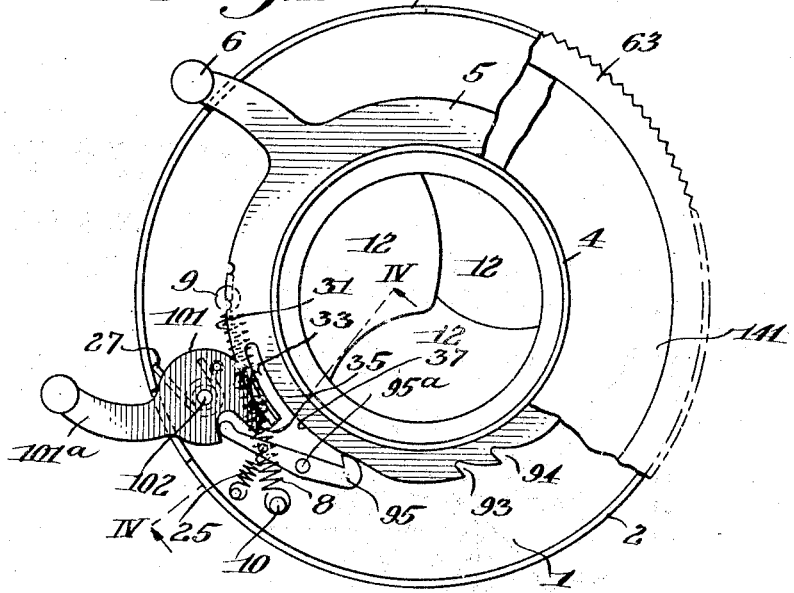
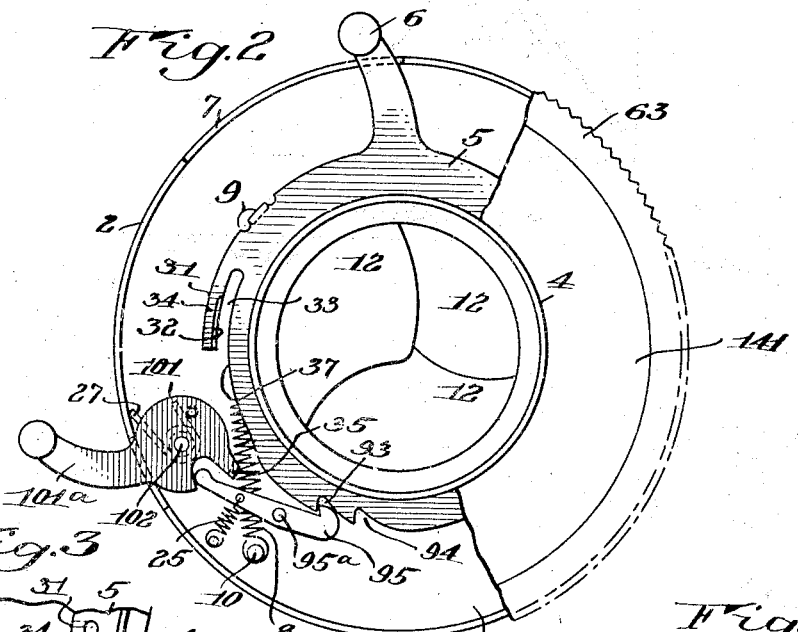
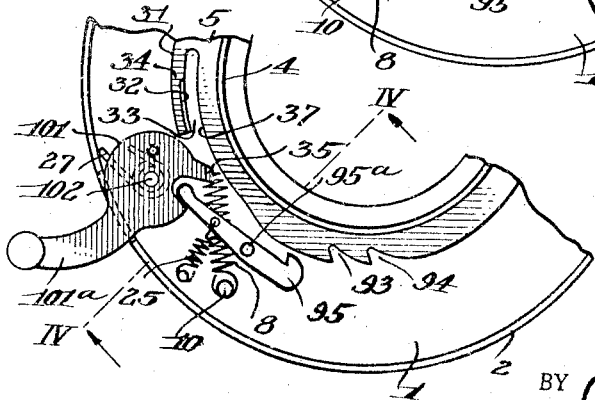
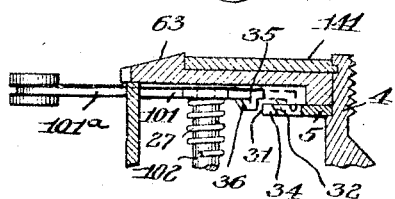
INVENTOR.
Hans Zizelsberger
BY Cumpston & Shepard
his ATTORNEYS Patented Dec. 19, 1939

2,183,802

UNITED STATES PATENT OFFICE 2,183,802

PHOTOGRAPHIC SHUTTER

Hans Zizelsberger, Munich, Germany, assignor to Friedrich Deckel, Munich-Prince Ludwigshohe, Germany Application August 11, 1938, Serial No. 224,327

7 Claims. (Cl. 95—63)

This invention relates to photographic shutters for use on cameras or the like, and more particularly to shutters of the so-called set type, wherein a master member or operating member is first set to tensioned position before the exposure is to be made, and then is released at the time of making the exposure, so that it moves back from tensioned position to rest position and operates the shutter blades during such movement. Usually, one finger piece or other operating mechanism is employed for setting the master member to its tensioned position, and a separate finger piece or cable release is employed for releasing the set master member. In some instances, however, shutters of this type employ only a single finger piece, movable in one direction to set the shutter and movable in the opposite direction to release it.

It sometimes happens, particularly with inexperienced photographers, that the operator forgets to tension the shutter before making the exposure, and then presses the release member and thinks he has made an exposure whereas really the shutter has not been operated. To avoid the disappointment and wastage of film thus occasioned, it is an object of the present invention to provide simple, compact, and inexpensive means for holding the release member against releasing movement unless the master member has been set or tensioned. Thus when the operator attempts to move the release member, unaware that the shutter has not been properly tensioned, he will find that he can not move the release member through its normal proper range of movement, and this will bring to his attention the fact that the shutter has not been set or tensioned. If, however, the shutter has been tensioned, then the release member will move through its normal range of movement when proper pressure is applied, and the exposure will be made.

Another object of the invention is the provision of holding or blocking means of the kind above mentioned, arranged entirely within the shutter casing, so that there are no blocking parts outside of the casing which are likely to be damaged by accidental contact or which are accessible so that they may be improperly manipulated to defeat the object of the automatic blocking means.

A further object is the provision of simplified blocking means within the casing, so designed and constructed that no additional parts whatever are necessary, blocking of the release member being accomplished entirely by a special construction of parts necessarily present in the shutter, thus avoiding the expense of providing separate blocking parts and the danger of breakage thereof.

To these and other ends the invention resides in certain improvements and combinations of parts, all as will be hereinafter more fully described, the novel features being pointed out in the claims at the end of the specification.

In the drawing:

Fig. 1 is a front view of a shutter with part of the front casing broken away to show parts beneath, illustrating a preferred embodiment of the present invention, with the master member in its rest position and with the release member blocked against releasing movement;

Fig. 2 is a similar view showing the master member in its tensioned position and with the release member unblocked so that it is free to move to releasing position;

Fig. 3 is a view similar to Fig. 2, with the release member moved to releasing position, and Fig. 4 is a fragmentary cross section on an enlarged scale, taken substantially on the lines IV—IV of Figs. 1 and 3.

The same reference numerals throughout the several views indicate the same parts.

The drawing is somewhat diagrammatic or schematic, and does not illustrate a complete photographic shutter but only those parts thereof which are helpful to an understanding of the present invention by those skilled in this art. The other parts of the shutter, not here illustrated or described, may be constructed in any suitable known manner, such, for example, as the manner disclosed in United States Patent 1,687,123, granted October 9, 1928, for an invention of Friedrich Deckel and Martin Geiger. Said patent is referred to for the purpose of identifying one suitable type of shutter construction with which the present invention may be used, but the present invention is also capable of use with many different types or constructions of shutters, the application of the invention to different kinds of shutters being readily apparent to those skilled in the art.

In the present illustrative embodiment, the shutter may comprise a casing having a back wall 1, an annular outer wall 2, an annular inner wall 4, a master member or shutter operating member 5 mounted to turn or oscillate around the periphery of the tubular wall 4 as a pivot, and a finger piece or setting member 6 extending out through a slot 7 in the casing wall 2. A motor spring 8 within the casing is secured at one end, at 9, to the master member 5, and is secured at the other end to a fixed pin or lug 10 in the casing. When the master member 5 is turned in a clockwise direction by force applied to the finger piece 6, this tensions the motor spring 8, and when thus tensioned the master member is held in tensioned position by the hooked end of a latch 95 engaging one or another of the notches 93 and 94 in the master ring 5. All of the above described parts may correspond to the parts bearing the same reference numerals in said Deckel and Geiger patent.

The latch 95 is pivotally mounted on a pivot 95a and is in the form of a two-armed lever, one arm of which carries the latching nose or hook, and the other arm engages a notch in the release member 101 rotatably mounted on a fixed pivot 102 in the casing. When the release member is turned in counterclockwise direction, it presses the left end of the latch 95 toward the center of the shutter and moves the right end thereof away from the center of the shutter, disengaging it from the notch 93 or 94 in which it was engaged. This releases the master member 5, which returns from its tensioned position of Fig. 2 to its normal rest position of Fig. 1, under the influence of the motor spring 8, and during such return movement of the master member 5, it opens and closes the shutter blades 12 in known manner. The release member 101 may be moved to release the latch 95, either by means of a suitable cable release of known form, or by pressure applied directly to an accessible finger piece 101a which extends out through a slot in the side wall 2 of the camera casing.

A spring 25 may be provided, connected at one end to the latch 95 and at the other end to a fixed pin or lug in the casing, to tend to hold the latch 95 in latching position, so that as soon as one of the notches 93 or 94 comes opposite the nose of the latch 95, the latch will engage the notch. A spring 27 may, if desired, be provided for holding the release member 101 in its neutral position, shown in Figs. 1 and 2, which position may be determined, for example, by engagement of the finger piece 101a with the upper end of the slot through which it extends. The shutter may have a setting ring 63 and a cover plate 141 overlying part of the setting ring, these parts corresponding to the parts bearing the same reference numerals in said Deckel and Geiger patent, and constituting the front cover of the casing, which casing encloses all of the operating parts above described except the setting finger piece 6 and the release finger piece 101a.

According to the present invention, the master member 5 and the release member 101 are developed in such a manner that they coact with each other to prevent releasing movement of the release member when the master member is in its rest position, but the release member may be moved to release position when the master member is in its tensioned position. In the preferred embodiment of the invention, this is accomplished by forming the master member with a portion which is closely adjacent the release member to block the release member against releasing movement when the master member is in rest position. When, however, the master member is shifted to tensioned position, the blocking portion thereof is moved away from the release member and another portion of the master member is brought opposite the release member, farther removed therefrom and out of the path of movement of the release member, so that it will not interfere with releasing movement thereof.

For example, the master member 5 may be so formed that one peripheral edge portion 31 thereof forms a blocking portion, preferably concentric with the axis of rotation or oscillation of the master member. When the master member is in rest position, as in Fig. 1, this blocking portion 31 lies opposite the release member 101 and relatively close to it, in the path of movement of some part of the release member if it be attempted to turn the release member from neutral position to release position. For instance, the release member may be formed on one place of its periphery toward the master member, with a downward projection 35 almost contacting with the blocking portion 31 when this blocking portion lies opposite the release member and when the release member is in its neutral position, shown in Fig. 1. Any attempt to move the release member 101 in a counterclockwise direction to its release position will now be prevented, for the blocking portion 31 lies in the necessary path of travel of the projection 35 at the lower right hand end of the release member. If the operator attempts to move the release member 101 while the master member is in the rest position or untensioned position shown in Fig. 1, the release member will not turn through its normal range of movement, and this will attract the user's attention to the fact that the master member has not been tensioned.

When the master member 5 is moved from rest position (Fig. 1) to tensioned position (Fig. 2), this moves the blocking portion 31 beyond the release member 101 and brings opposite the release member another portion 37 of the master member, which may be described as cut away or recessed with respect to the blocking member 31. That is, the portion 37 of the master member is spaced a substantial distance from the projection 35 of the release member 101, and does not lie in the path of movement of the release member. When the master member is in this tensioned position (Fig. 2) it does not block or impede movement of the release member, and the release member may then be moved to its release position (Fig. 3) to release the master member and thus to permit the master member to return to its rest position under the influence of the spring 8, opening and closing the shutter blades 12 to make an exposure during such return movement. If in this return movement of the master member the release member is still depressed, the projection 35 can lie in a slot 38 of the master member without impeding the return movement of the latter. In returning of the release member to its rest position under the influence of the springs 27 and 25 the projection 35 passes over the arm 34 of the master member; for this purpose the projection 35 and the arm 34 have bevelled edges 36 and 32 respectively, and the arm 34 is resilient in the direction perpendicular to the plane of the master member 5 so that it may flex downwardly and permit the projection 36 to pass over it, from the dotted line position to the full line position of Fig. 4, when the release member or trigger 101 returns from its actuated or release position to its normal rest or neutral position.

It is seen that the blocking arrangement above described effectively prevents any attempt to release or trip the shutter when it has not been properly tensioned, and that all parts of the blocking mechanism are not only within the shutter casing, but are constituted by special constructions of the master member 5 and release member 101 themselves, both of which members are necessary parts of the shutter. Thus no additional or extra parts are provided to form the blocking means of the present invention, beside those parts which are otherwise needed in the shutter and which can, with negligible additional expense, be made to coact with each other in the manner above described, to accomplish the blocking function.

This blocking construction is, of course, suitable for shutters capable of various different speeds of "instantaneous" exposures. If the shutter is to be capable also of "time" and "bulb" exposures, then preferably the shutter is so arranged that the master ring 5 is tensioned for time and bulb exposures as well as for instantaneous exposures, a shutter with such a master ring being disclosed, for example, in the copending United States patent application of Michael Burger, Serial No. 116,159, filed December 16, 1936, for Photographic camera and shutter construction, in which see especially the construction illustrated in Figs. 4, 5, and 6 of the drawings. If it is preferred that the master ring be not tensioned for making time and bulb exposures, as is the case with the shutter disclosed in said Deckel and Geiger patent, then the time and bulb levers 105, 108, 109, etc., of said Deckel and Geiger patent may be operated by a special time and bulb operating member rather than by the release member 101, or other special arrangements known to those skilled in the art may be employed to permit the making of time and bulb exposures when the master member 5 is in its rest or untensioned position.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A photographic shutter including a master member for operating the shutter, means for moving said master member from a rest position to a tensioned position ready to operate said shutter to make an exposure, and a release member movable to release said master member for exposure-making movement from said tensioned position back to said rest position, characterized by the fact that said release member has an integral portion which moves in a general direction toward the central part of said master member when said release member moves in a releasing direction, and that said master member has a portion so shaped as to lie in the path of movement of said portion of said release member to block releasing movement thereof when said master member is in said rest position, movement of said master member to its tensioned position being effective to withdraw said blocking portion from said path of movement of said release member so that said release member may be moved to release said master member.

2. A photographic shutter including a casing, a master member movable within said casing for operating the shutter, means accessible from the exterior of the casing for moving said master member from a rest position to a tensioned position ready to operate said shutter to make an exposure, a latch member within said casing for latching said master member in tensioned position when it has been moved thereto, and a release member mounted for movement from a neutral position to a release position, said release member cooperating with said latch member and being effective during such movement to move said latch member to unlatching position to release said master member for exposure-making movement from said tensioned position back to said rest position, said release member having a portion substantially rigid with the remainder thereof and moving in a general direction toward the central part of said master member when said release member moves in a releasing direction, said master member having a portion lying in the path of movement of said portion of said release member and blocking movement thereof to said release position when said master member is in said rest position, movement of said master member to said tensioned position being effective to withdraw said blocking portion from the path of movement of said release member so that said release member may be moved to said release position.

3. A photographic shutter including a casing, a master member of generally ring shaped form mounted within said casing for oscillating movement substantially about its center as an axis, for operating the shutter, means accessible from the exterior of the casing for moving said master member from a rest position to a tensioned position ready to operate said shutter to make an exposure, and a release member pivotally mounted for movement about an axis externally of said master member from a neutral position to a release position to release said master member for exposure-making movement from said tensioned position back to said rest position, said release member having a portion integral with the main portion of said release member which moves in a general direction toward the center of said master member as said release member moves in a releasing direction, said master member having an edge so shaped as to be closely adjacent to said portion of said release member to lie in the path of releasing movement thereof to prevent such releasing movement when said master member is in said rest position and so shaped as to be clear of said release member in non-interfering relation thereto when said master member is in said tensioned position.

4. A photographic shutter including a casing, an annular ring-like master member mounted for oscillation within said casing between a rest position and a tensioned position, means accessible from the exterior of said casing for moving said master member from said rest position to said tensioned position, means for holding said master member in tensioned position when it has been moved thereto, and a release member operable from the exterior of said casing and mounted for oscillating movement about an axis adjacent said master member from a neutral position to a release position for releasing said holding means so that said master member may move from said tensioned position to said rest position to make an exposure, characterized by the fact that said release member has a portion lying approximately in the plane of a peripheral portion of said master member and moving inwardly in a general direction toward the center of said master member when said release member is moved from neutral position to release position, and that said peripheral portion of said master member is so shaped that when said master member is in its rest position, the portion of its periphery which is opposite said release member is closely adjacent thereto and lies in the path of movement of said portion of said release member from neutral position to release position so as to block releasing movement thereof, and that when said master member is in its tensioned position, the portion of its periphery which is then opposite said release member is further removed therefrom in non-blocking relation thereto so that said release member may be moved to release position.

5. A photographic shutter including a casing, an annular ring-like master member mounted for oscillation within said casing between a rest position and a tensioned position, means accessible from the exterior of said casing for moving said master member from said rest position to said tensioned position, means for holding said master member in tensioned position when it has been moved thereto, and a release member operable from the exterior of said casing and mounted for oscillating movement about an axis adjacent said master member from a neutral position to a release position for releasing said holding means so that said master member may move from said tensioned position to said rest position to make an exposure, characterized by the fact that said release member has a lug thereon, and that said master member has a portion forming a finger normally lying in the plane in which said lug moves when said release member is moved and being relatively rigid in said plane and relatively resilient in a direction perpendicular to such plane, said finger being withdrawn from said lug in non-obstructing relation thereto when said master member is in tensioned position and lying in the path of movement of said lug between neutral and release positions when said master member is in rest position to block movement of said release member from neutral position to release position, at least one of the cooperating surfaces of said lug and said finger being bevelled in such direction that said lug may displace said finger and ride over said finger to permit return of said release member from release position to neutral position when said master member is in rest position.

6. A photographic shutter including a casing, an annular ring-like master member mounted for oscillation within said casing between a rest position and a tensioned position, means accessible from the exterior of said casing for moving said master member from said rest position to said tensioned position, means for holding said master member in tensioned position when it has been moved thereto, and a release member operable from the exterior of said casing and mounted for oscillating movement about an axis adjacent said master member from a neutral position to a release position for releasing said holding means so that said master member may move from said tensioned position to said rest position to make an exposure, characterized by the fact that said master member has a circumferentially extending finger spaced from the main body of the ring throughout a substantial portion of its length and relatively rigid against deformation in directions in the plane of said ring and resilient in a direction perpendicular to said plane, said finger being placed on said master member in a position which will lie closely adjacent said release member when said master member is in rest position and which will be removed from the proximity of said release member by movement of said master member to tensioned position, and that said release member has a portion integral therewith and so placed as to lie outside of said finger and to move in a direction toward the outer edge of said finger to be blocked thereby when said release member is moved in a releasing direction while said master member is in rest position, said integral portion of said release member lying in the space between said finger and the main body of said master member as said master member completes an exposure-making movement to rest position with said release member held in release position.

7. A photographic shutter including a casing, a master member mounted within said casing for oscillation about an axis, means accessible from the exterior of the casing for moving said master member from a rest position to a tensioned position ready to operate said shutter to make an exposure, and a release member mounted for movement from a neutral position in which said master member is retained in its tensioned position, to a release position releasing said master member for exposure-making movement from tensioned position back to said rest position, characterized by the fact that said master member and said release member both move in planes approximately parallel to each other, and that said master member has a portion located in a position to lie approximately alongside of said release member when said master member is in its rest position and to be removed from said release member when said master member is in its tensioned position, and that said release member has a portion movable in a direction toward said portion of said master member and blocked against movement thereby when it is attempted to move said release member in releasing direction while said master member is in its rest position, both of said portions being substantially rigid against deformation in directions parallel to said planes of movement, one of said portions being resilient in a direction perpendicular to said planes of movement so that said resilient one of said portions may be deformed out of the plane of the other of said two portions to allow said portions to slide past each other during return of said release member from its release position to its neutral position while said master member is in rest position.

HANS ZIZELSBERGER.